(12) United States Patent
Smith et al.

(10) Patent No.: US 6,661,524 B2
(45) Date of Patent: Dec. 9, 2003

(54) VEHICLE REGIONAL SCANNER

(75) Inventors: Thomas D. Smith, York, PA (US); Peter Henry, York, PA (US)

(73) Assignee: United Defense, L.P., Arlington, VA (US)

( * ) Notice: Subject to any disclaimer, the term of this patent is extended or adjusted under 35 U.S.C. 154(b) by 0 days.

(21) Appl. No.: 09/902,058

(22) Filed: Jul. 9, 2001

(65) Prior Publication Data

US 2003/0007160 A1 Jan. 9, 2003

(51) Int. Cl.$^7$ .............................................. G06F 165/00
(52) U.S. Cl. .................... 356/614; 356/3.01; 56/10.2 F
(58) Field of Search .............................. 356/614, 3.01, 356/3.02; 56/10.2 F

(56) References Cited

U.S. PATENT DOCUMENTS

| | | | | |
|---|---|---|---|---|
| 5,509,486 A | * | 4/1996 | Anderson ........................ | 172/6 |
| 5,715,666 A | * | 2/1998 | Huster et al. ............. | 56/10.2 F |
| 5,937,621 A | * | 8/1999 | Eggenhaus ................ | 56/10.2 E |
| 6,026,135 A | * | 2/2000 | McFee et al. ................ | 250/392 |
| 6,095,254 A | * | 8/2000 | Homburg ........................ | 172/6 |
| 6,286,607 B1 | * | 9/2001 | Ohtomo et al. .............. | 172/4.5 |
| 6,389,785 B1 | * | 5/2002 | Diekhans et al. ............. | 172/4.5 |
| 6,397,569 B1 | * | 6/2002 | Homburg et al. ......... | 56/10.2 F |

* cited by examiner

*Primary Examiner*—John R. Lee
*Assistant Examiner*—Anthony Quash
(74) *Attorney, Agent, or Firm*—Ronald C. Kamp

(57) ABSTRACT

A method and apparatus for measuring ground height in front of a vehicle, such as a vehicle for clearing buried land mines, in which a scanning pulsed laser to used to scan along one or more lines in front of the vehicle, with such scanning being executed more slowly in certain regions where data is collected and more quickly in intermediate regions where data is not collected. The time of flight along those lines is measured, and using that measurement, the ground height calculated and stored, with the higher elevations being discarded as the representing the tops of vegetation and the lower elevations being representative of the ground height or elevation in front of blade. A dozer blade on the vehicle is then adjusted in response to the calculated height to position the blade for the proper depth of cut in order to effectively uncover and remove the buried mines.

15 Claims, 2 Drawing Sheets

VEHICLE REGIONAL SCANNER

The present invention relates generally to a laser scanner that is mounted on a vehicle and used during the vehicle's forward motion to determine the elevation of the ground surface in front of the moving vehicle by non-contact means, even though the ground surface may be covered by vegetation.

BACKGROUND OF THE INVENTION

On certain vehicles, such as bulldozers or land mine removing vehicles, it is important to know the elevation and contour of the ground with respect to the vehicle. Vegetation and rocks on the ground make such determinations difficult, because the sensor may sense the tops of vegetation or small rocks instead of the ground surface. As the blade of a bulldozer or land mine removing vehicle moves through the soil, the elevation immediately in front of the blade changes as the loose soil cut by the blade piles up against and is pushed forward by the blade. It is, therefore, necessary to determine the ground elevation of the undisturbed surface at a distance in front of the blade. Land mine removing vehicles have additional difficulties since physical sensors used to sense the elevation of the ground surface may be damaged or destroyed by rapidly expanding gases or flying debris creating by an exploding land mine. Knowing the ground elevation and contour with respect to the dozer blade is very important in order to maintain the blade at the proper depth and angle. If the blade is too shallow, the blade may pass over a land mine, permitting its subsequent detonation under the vehicle and thereby damaging or destroying the vehicle and possibly injuring personnel on board. If the blade is too deep, the forward progress of vehicle is slowed, lengthening the time required to clear the mine field, which could adversely affect the associated military operation, and in some cases may even cause the vehicle to stall. Knowing the ground height or elevation and contour allows for a safer and more efficient use of the vehicle. The "angle" to which reference is made is that angle between the blade and horizontal, and is achieved by raising or lowering one end of the blade to essentially rotate the blade about the longitudinal centerline of the vehicle. For clarity, that angle will be called the "tilt angle", and movements of the blade to vary the tilt angle will be referred to as "tilt" or "tilting."

BRIEF SUMMARY OF THE INVENTION

It is an object of the invention to provide a vehicle with a laser scanner that is able to determine height or elevation of the ground surface and its contour in front of the moving vehicle.

It is another object of the invention to provide a system that can measure ground height or surface elevation and is unaffected by the presence of vegetation.

It is another object of the invention to provide a land mine removing vehicle that is able to detect ground surface elevation and contour by remote, non-contact sensing.

The present invention provides a scanning laser system that is able to temporarily scan through vegetation to determine the elevation of the ground surface with respect to the vehicle.

DETAILED DESCRIPTION OF THE PREFERRED EMBODIMENTS

Figure 1:
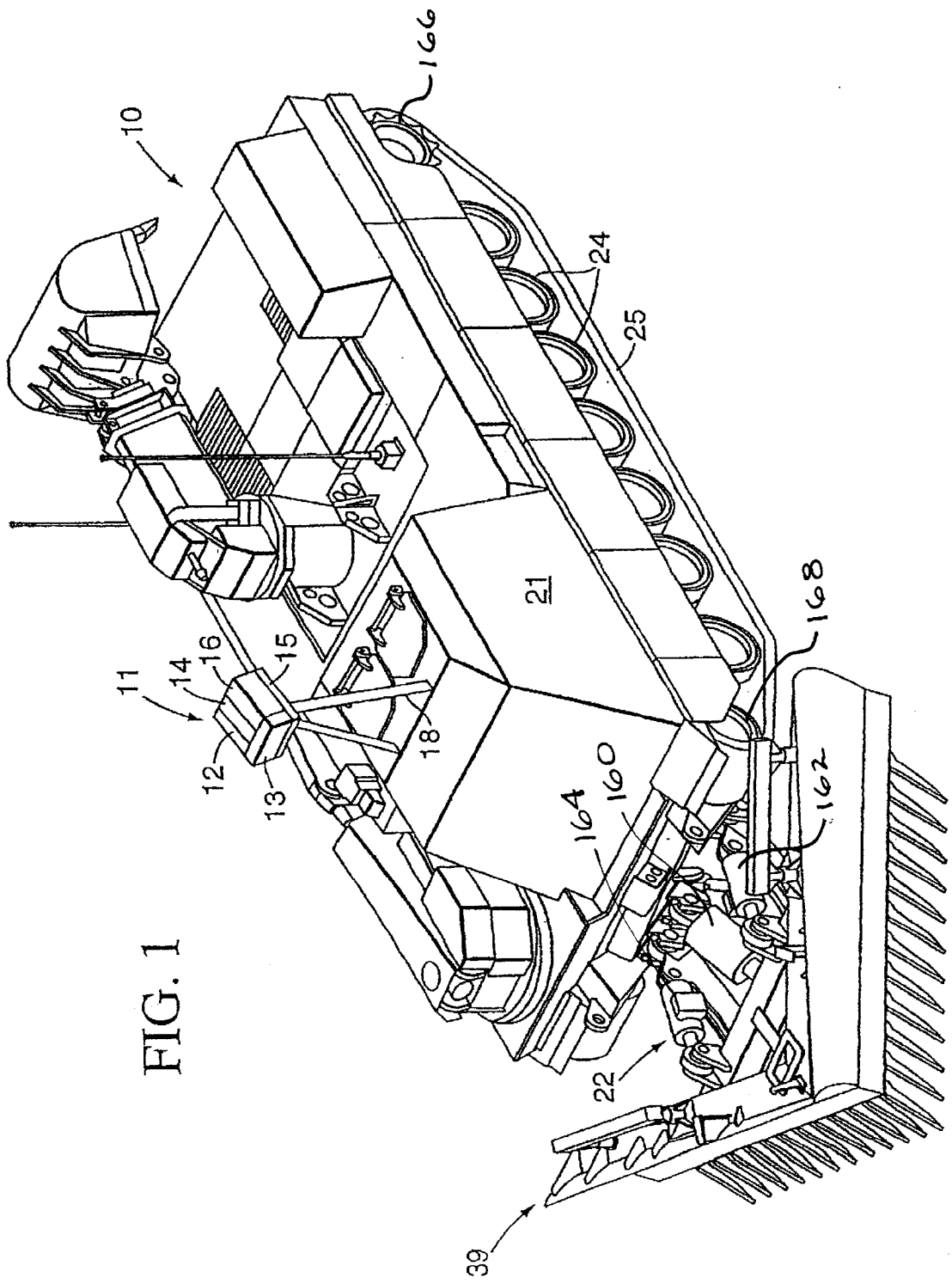
FIG. 1 is a perspective view of a vehicle with a preferred embodiment of the invention.

FIG. 1 is a perspective view of a vehicle 10 equipped with a preferred embodiment of the invention. In this embodiment, a range finder assembly 11 comprising a laser 12, a moving or rotating mirror assembly 13, a sensor 14, a processor 15 including volatile memory, and a controller 16 is mounted on a range finder support 18. The range finder support 18 is mounted on the chassis 21 of the vehicle 10, which, for example, may be a land mine clearing vehicle. The mine clearing vehicle 10 has a plowing or dozer blade 39 connected to the chassis 21 through a blade connection and position control system 22. The blade connection system 22 includes a central lift cylinder 160 capable of raising and lowering the blade 39, and left and right of pitch/tilt cylinders 162 and 164. Simultaneous extension of both cylinders 162 and 164 will pitch the top of the blade forward and simultaneous retraction will pitch the top of the blade rearward. Tilt of the blade 39 is achieved by independent actuation of the cylinders 162 and 164. For example, extension of the left cylinder 162 alone will cause the blade 39 to tilt toward the right and extension of the right cylinder 164 by itself will cause the blade 39 to tilt to the left.

The range finder support 18 is mounted away from the blade 39 far enough to isolate the range finder assembly 11 from the deleterious effects of exploding land mines. In the embodiment illustrated in FIG. 1, the range finder support 18 is secured to the chassis 21 behind the plowing blade 39 with the assembly 11 mounted thereon at a height sufficient to allow the laser 12 to project its beam onto the ground in front of the blade at an oblique angle with respect to a horizontal surface. The chassis 21 is supported on a pair of tracks 25, each of which is trained around a rear drive sprocket 166 and a front idler sprocket 168. A plurality of road wheels 24 engage the lower run of each track 25 and are positioned intermediate to the sprockets 166 and 168 with each wheel 24 being mounted on a road arm connected to and suspended from the chassis 21.

Figure 2:
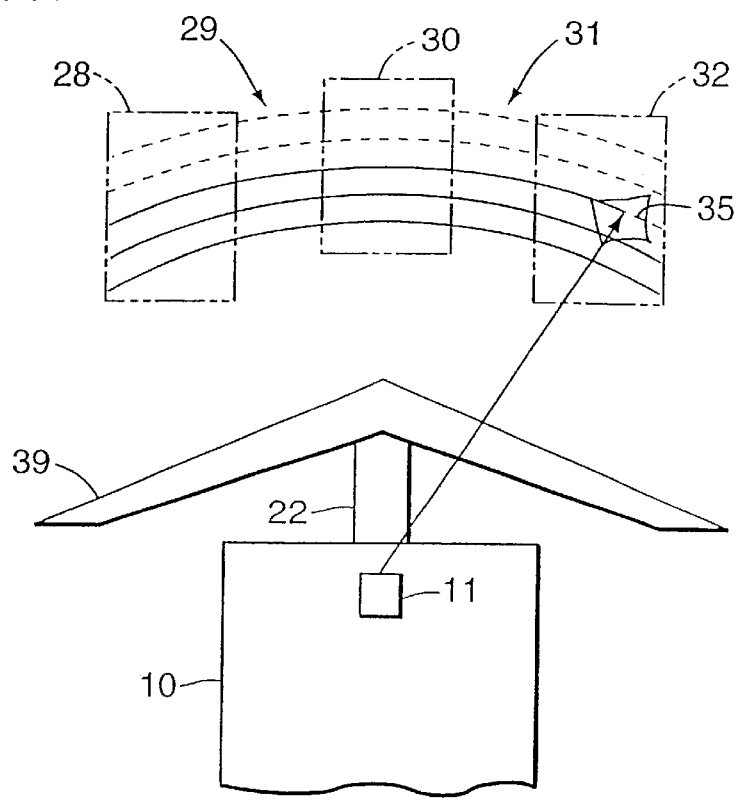
FIG. 2 is a schematic top view of the vehicle shown in FIG. 1 equipped with a preferred embodiment of the invention.

In operation, the vehicle 10 is propelled by the tracks 25 in a forward direction as they are simultaneously driven by the drive sprockets 166, so that the blade 39 may engage and, if adjusted to do so, cut the ground in front of the vehicle. The narrow beam laser 12 in the range finder assembly 11 is projected toward the ground surface in a horizontal scan, i.e. transverse to the longitudinal axis of the vehicle 10, by the rotating mirror assembly 13, which causes the beam to follow an arcuate path 35, which is essentially a very large circular arc, as illustrated in FIG. 2. The laser 12 may be of the pulse-echo type, which creates discrete pulses of coherent light during the scan so that the path or line 35 is defined by a sequence of dots, each dot being a pulse of light from the laser 12. Each circular arc line passes through a first scan region 28, a first intermediate region 29, a second scan region 30, a second intermediate region 31, and a third scan region 32, where a series of 1 to n parallel, circular arc lines comprise a scan region. As illustrated in FIG. 2, the single line presently being scanned is the last path in a scan region represented by the single line 35. The two solid lines below the single line 35 represent the path of the laser beam during previous traverses of the aforementioned regions, the displacement between the paths represented by these two solid lines being a function of the vehicle's velocity. Together they form a 5 line scan region (n=5). The two broken lines above the single line 35 represent the anticipated paths of the laser beam as the vehicle moves forward.

As the laser scans along an individual line across the first scan region 28, the rotating mirror assembly 13 causes the laser beam to scan at a relatively slow rate of approximately one half of a degree per laser pulse (0.5°/pulse). At that rate, at least some of the pulses of light will penetrate through any vegetation to reach the surface of the ground and be reflected thereby. Light from each pulse of the pulse-echo beam is reflected by the ground surface or vegetation along the same path taken by the pulse of light to the rotating mirror 13 that then reflects the incident light to the sensor 14. The time of flight for each pulse, i.e. the time elapsed between the time when the pulse is emitted to the time when the sensor 14 detects the light reflected from that pulse, is recorded and the distance to the surface creating the reflection is calculated by the processor 15. The calculated distances are stored in memory until the path 35 is completely traversed. As the laser beam crosses the first intermediate region 29, the rotating mirror assembly 13 causes the laser beam to move along the path as fast as possible, i.e. at a rate as fast as it is possible to move the mirror assembly, but in any event much greater than 0.5° per laser pulse. No data is collected as the laser crosses this intermediate region. As the laser scans across the second scan region 30, the rotating mirror assembly 13 again causes the laser beam to move at a slow rate of approximately 0.5° per laser pulse. As with the first scan region 28, light from each pulse of the laser beam is reflected from the ground or vegetation along the same path to the rotating mirror 13 and to the sensor 14, the time of flight is determined and the distance to the ground is calculated and stored by the processor 15. As the laser beam traverses the second intermediate region 31, the rotating mirror assembly 13 causes the laser beam to move along the line as fast as possible, similar to the speed of traverse across the first intermediate region 29. Again, no data is collected in this intermediate region. As the laser beam moves along the line in the third scan region 32, the rotating mirror assembly 13 causes the laser beam to move at a slow rate of approximately 0.5° per laser pulse. Reflected light from each pulse of the laser beam is directed to the sensor 14 by the mirror 13 which permits the time of flight to be determined and the distance to the ground to be calculated and stored by the processor 16. FIG. 2 shows the laser 12 having almost completed its traverse of the line 35, with the broken line indicating that portion of the line 35 remaining to be scanned.

Each pulse of light from the laser in the scan regions 28, 30 and 32 produces a calculated data point representative of the distance to the surface that reflected that pulse. These data points taken along successive paths in each of the scan regions 28, 30 and 32 are stored by the processor 15. Once the line 35 is completely traversed, the distances between the lines in each individual scan region are processed to determine a range estimate to the ground surface for the scan region. The shorter ranges represent distances to the tops of vegetation or rocks, while the maximum ranges indicate the distance to the ground surface. Thus, a reasonably accurate determination of the height or elevation of the ground surface can be made. That determination is then sent to the controller 16 which causes hydraulic fluid to be directed to, or exhausted from, the lift cylinder 160 in order to position the blade 39 to cut through the ground at the desired depth below the surface. Also, by comparing the maximum distances for the first, second, and third scan regions 28, 30 and 32, the lateral slope or contour of the ground can be determined, and the controller 16 can cause hydraulic fluid to be directed to the cylinders 162 and 164 to incline the blade 39 so that in conforms more closely to the slope or contour of the ground surface.

When the rotating mirror assembly 13 commences the next horizontal scan, the vehicle 10 will have moved forward causing the laser beam to follow a path indicated by the broken line just above the line 35.

It has been shown experimentally that, even with dense vegetation, a relatively slow scan rate with a narrow beam laser allows enough data points to be recorded in each region so that at least some will be the result of the beam penetrating the vegetation to reach the surface of the ground and be reflected thereby. The technique described above is robust in that the results are not significantly affected by variations in vehicle speed, or by vibrations or other factors that may slightly alter the direction of the laser beam. Variations in the angle the beam makes with a horizontal surface, such as may be caused by extreme vibration or fore and aft pitching of the vehicle 10, can affect the accuracy of the calculated distances, unless compensated. Thus, the scan speed, i.e. the speed of traversing each path, should be fast enough to be completed before any significant variation of the beam angle occurs.

The shape of the footprint of scanned region is not critical since the only requirement is for the density of the dots in each region be great enough to obtain a reasonable number of vegetation penetrations. Further, three regions for active scanning are ideal since they correspond to the lines of travel of the middle and the two ends of the blade But more than three regions per scan is consistent with the spirit of this invention.

Figure 3:
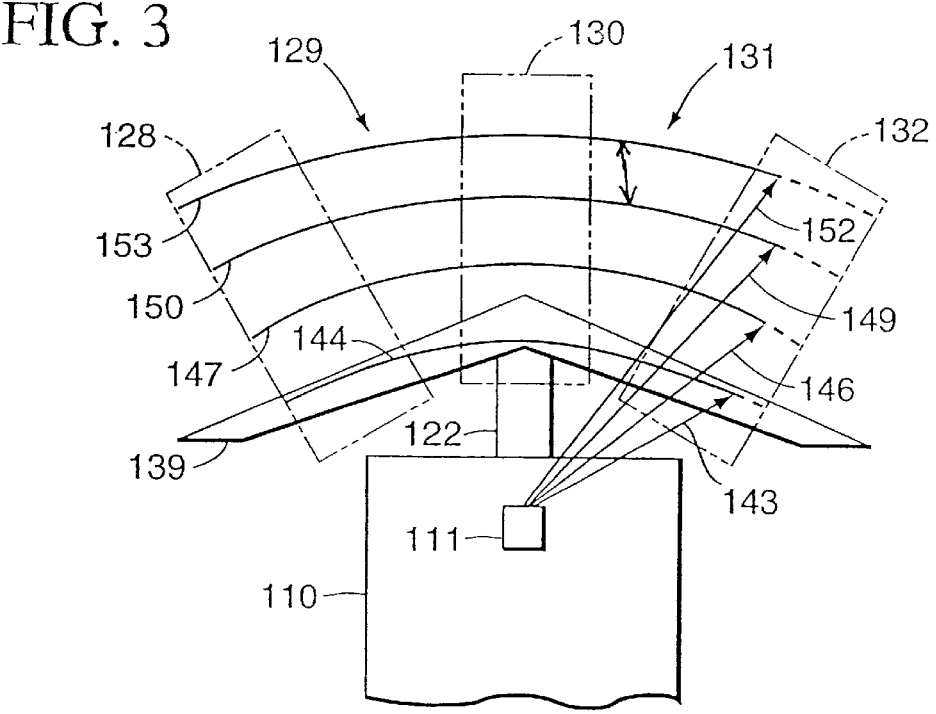
FIG. 3 is a schematic top view of another embodiment of the invention.

FIG. 3 is a schematic illustration of another embodiment of the invention. A vehicle 110 has a blade 139 attached to, and mounted for movement relative to the vehicle, through a blade connection system 122. A range finder assembly 111 is mounted on top of the vehicle 110 and provides four laser beams, either by using multiple lasers or by dividing the laser beam into separate beams.

In operation, a first laser beam 143 creates a first scan line 144 which contacts the blade 139 and thus provides a means for determining the position of the blade. Separate laser beams, identified as second beam 146, third beam 149 and fourth beam 152 simultaneously scan associated lines or paths 147, 150 and 153, respectively. The scan lines 147, 150, 153 are all positioned to be in front of the blade 139. As with the previous embodiment, there is a first scan region 128, a first intermediate region 129, a second scan region 130, a second intermediate region 131, and a third scan region 132. The first, second, third, and fourth laser beams 143, 146, 149 and 152 scan slowly through the first, second, and third scan regions 128, 130, 132 and quickly through the first and second intermediate regions 129, 131 in a manner similar to the scanning pattern of the laser beam in the embodiment of FIG. 2. The light from the beam 143 is reflected from the blade 139, sensed and the time of flight determined, which in turn permits the present position and orientation of the blade 139 to be determined. Thus, a separate sensor is not needed to determine present blade position, which information is needed to accurately position the blade at the desired depth. The range finder assembly 111 uses data from the second scan line 147 to determine the ground height close to the blade 139. The range finder assembly 111 uses data from the third and fourth scan lines 150 and 153 to determine the ground configuration further ahead and thus, with the data from the second scan line, provide an indication of changes in the elevation of the ground surface. This provides an indication of what elevations of ground surface the vehicle will encounter in the immediate future and permits the controller 16 to begin adjustments in the blade height and tilt before those elevations are actually engaged, thus compensating for the time delays normally required to achieve fluid flow into or out of the proper ones of the cylinders 160, 162 and 164. In this regard the embodiment of FIG. 3 may be characterized as predicative, while the embodiment of FIG. 2 is reactive in nature.

In other embodiments of the invention, a different number of beams may be used and other means may be used to cause the laser beam to scan, such as a rotating prism, a changing refraction means, or a rotating laser. A multiple beam scan can also be accomplished using a single scan laser that scans far enough in front of the vehicle to allow retaining the results of several successive scans in memory. The laser system is able to accurately determine the height or elevation of the surface of the ground at a distance in front of the blade and is not influenced by soil piled up in front of the blade as a result of the blade cutting through the soil. Such determinations or measurements are difficult with mechanical sensors.

While preferred embodiments of the present invention have been shown and described herein, it will be appreciated that various changes and modifications may be made herein without departing from the spirit of the invention as defined by the scope of the appended claims.

What is claimed is:

1. A method for detecting the height of the ground covered with vegetation in front of a vehicle having an adjustable dozer blade, comprising the steps of:

scanning a laser beam in front of the vehicle along a path essentially transverse to the motion of the vehicle, wherein the beam traverses said path at a speed sufficiently slow to allow the beam to penetrate the vegetation and be reflected from the ground at some points along said path;

sensing the reflected light of the laser beam at a plurality of discrete points along said path;

determining from the sensed reflected laser light the time of flight of the laser beam at each of the plurality of points; and calculating the height of the ground based upon the longest time of flight.

2. The method according to claim 1, wherein the path includes at least one intermediate segment and further comprising the steps of:

moving said beam along said intermediate segment at a speed much higher than said slow speed; and ignoring the time of flight for light reflected during the traverse of the intermediate segment.

3. The method according to claim 2 wherein the intermediate segment defines left and right end segments for said path and further comprising the steps of:

separately sensing the reflected light of the laser beam at a plurality of discrete points along each of the end segments of said path;

separately determining from the sensed reflected laser light the time of flight of the laser beam at each of the plurality of points along each end segment; and separately calculating the height of the ground for each end segment based upon the longest time of flight associated with the respective end segment.

4. The method, as claimed in claim 3, further comprising the step of raising and lowering the ends of the dozer blade in front of the vehicle according to the determined ground height at each of said end segments so that the blade will maintain a relatively uniform depth of cut.

5. The method according to claim 1, comprising the steps of:

passing a second laser beam along a second line in front of the vehicle, wherein said second line has a first, second and third scan segments separated by a first and second intermediate segments;

moving said beam in said scan segments at speeds sufficiently slow to permit the light from said beam to penetrate to the ground and be reflected;

moving said beam in said intermediate segments at a speed higher than said slow speed;

sensing reflected second laser light from only along said scan segments of said second line;

determining from sensed reflected laser light the time of flight of the laser beam at a plurality of points in said scan segments; and calculating the height of the ground from the determined time of flight.

6. The method according to claim 5, and further comprising the step of, comparing the heights along said second path with those along said first path to determine the change in height therebetween.

7. The method according to claim 6 further comprising the step of initiating the raising and lowering the blade in anticipation of said change in height.

8. A method for detecting the height of the ground covered with vegetation in front of a vehicle having an adjustable dozer blade, comprising the steps of:

scanning a plurality of laser beams in front of the vehicle, each of said beams following a path essentially transverse to the motion of the vehicle, wherein each beam traverses said its associated path at a speed sufficiently slow to allow the beam to penetrate the vegetation and be reflected from the ground at some points along said path;

sensing the reflected light of each laser beam at a plurality of discrete points along its associated path;

determining from the sensed reflected laser light the time of flight of each laser beam at each of the plurality of points; and calculating the height of the ground along each path based upon the longest time of flight.

9. The method according to claim 8 wherein a single laser beam is split into said plurality of beams.

10. A vehicle comprising:

a dozer blade mounted on the vehicle and capable of being raised and lowered and tilted;

a propulsion system connected to move the vehicle in a forward direction;

a laser for creating a laser beam mounted on the vehicle;

a scanner for scanning the laser beam along a path in front of the vehicle at a speed slow enough to penetrate vegetation and be reflected by the ground;

a sensor for sensing reflected laser light mounted on the chassis adjacent to said scanner; and a processor for determining from sensed reflected laser light the time of flight of the laser beam at a plurality of points along said path;

a memory device for storing the determined time of flight for each of said plurality of points;

and said processor calculating the height of the ground based on the longest of the determined times of flight.

11. The vehicle according to claim 10, and further comprising:
  adjustable cylinders for raising, lowering and tilting the blade; and
  said cylinders are adjusted responsive to the height calculated by said processor so that the blade maintains a substantially uniform depth of cut.

12. The vehicle according to claim 10, wherein said path has end segments separated by an intermediate segment and said scanner scans along the end segments at said slow speed and along said intermediate segment at a greater speed; and
  said memory device stores only the time of flight at points along said end segments.

13. The vehicle according to claim 12, wherein said processor is adapted to calculate the heights at each of the end segments to determine the transverse slope of the ground and said cylinders are adjusted to tilt said blade to conform to said slope.

14. The vehicle according to claim 10, where in said path has central and end segments with an intermediate segment between each end segment and the central segment,
  said scanner scans along said central and end segments at said slow speed and along said intermediate segments at a greater speed; and:
  said memory device stores only the times of flight at points along said central and end segments.

15. The vehicle, as claimed in claim 10, further comprising:
  means for providing a second laser beam for scanning along said blade;
  a second sensor for sensing light reflected from said blade; and
  said processor adapted to determine from said blade reflected light the present position of said blade.

* * * * *